US010826829B2

(12) United States Patent
Dong et al.

(10) Patent No.: US 10,826,829 B2
(45) Date of Patent: *Nov. 3, 2020

(54) SCALABLE HANDLING OF BGP ROUTE INFORMATION IN VXLAN WITH EVPN CONTROL PLANE

(71) Applicant: Cisco Technology, Inc., San Jose, CA (US)

(72) Inventors: Liqin Dong, San Jose, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,762

(22) Filed: Jan. 8, 2018

(65) Prior Publication Data
US 2018/0131610 A1 May 10, 2018

Related U.S. Application Data

(63) Continuation of application No. 14/670,185, filed on Mar. 26, 2015, now Pat. No. 9,900,250.

(51) Int. Cl.
*H04L 12/741* (2013.01)
*H04L 12/46* (2006.01)
(Continued)

(52) U.S. Cl.
CPC ........ *H04L 45/745* (2013.01); *H04L 12/4641* (2013.01); *H04L 12/4666* (2013.01); *H04L 45/586* (2013.01); *H04L 49/354* (2013.01)

(58) Field of Classification Search
CPC . H04L 45/586; H04L 45/745; H04L 12/4641; H04L 49/354
See application file for complete search history.

(56) References Cited

U.S. PATENT DOCUMENTS 4,688,695 A 8/1987 Hirohata
5,263,003 A 11/1993 Cowles et al.
(Continued)

FOREIGN PATENT DOCUMENTS

CN 103259726 A 8/2013
CN 104471899 A 3/2015
(Continued)

OTHER PUBLICATIONS

Notice of Allowance from U.S. Appl. No. 14/674,900 dated Dec. 6, 2016.
(Continued)

*Primary Examiner* — Yemane Mesfin
*Assistant Examiner* — Mon Cheri S Davenport
(74) *Attorney, Agent, or Firm* — Polsinelli PC

(57) ABSTRACT

A method for programming a MAC address table by a first leaf node in a network comprising a plurality of leaf nodes is provided. Each leaf node comprises one or more Virtual Tunnel End Points ("VTEPs") and instantiates a plurality of Virtual Routing and Forwarding elements ("VRFs"), with a corresponding Bridge Domain ("BD") assigned to each VRF. The method includes obtaining information indicating one or more VTEP Affinity Groups (VAGs), each VAG comprising an identification of one VTEP per leaf node, obtaining information indicating assignment of each VRF to one of the VAGs, assigning each VAG to a unique Filtering Identifier ("FID"), thereby generating one or more FIDs, and programming the MAC address table, using FIDs instead of BDs, by populating the MAC address table with a plurality of entries, each entry comprising a unique combination of a FID and a MAC address of a leaf node.

20 Claims, 5 Drawing Sheets

(51) Int. Cl.
*H04L 12/931* (2013.01)
*H04L 12/713* (2013.01)

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |

(56) References Cited

U.S. PATENT DOCUMENTS

| | | |
|---|---|---|
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lagar-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 * | 4/2017 | Dong ............... H04L 12/4666 |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 9,900,250 B2 * | 2/2018 | Dong ............... H04L 12/4666 |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |

(56) References Cited

U.S. PATENT DOCUMENTS

| | | |
|---|---|---|
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |

(56) References Cited

U.S. PATENT DOCUMENTS

| | | |
|---|---|---|
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang |
| 2014/0355450 A1 | 12/2014 | Bhikkaji |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0053353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1* | 12/2015 | Duda .............. G06F 17/30876 707/736 |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | | |
|---|---|---|---|
| EP | 2228719 | 9/2010 | |
| EP | 2439637 | 4/2012 | |
| EP | 2680155 | 1/2014 | |
| GB | 2350028 | 5/2001 | |
| JP | 2000-242434 | 9/2000 | |
| TW | 1566104 | 1/2017 | |
| WO | WO 2004/077214 | 9/2004 | |
| WO | 2016003489 | 1/2016 | |
| WO | WO 2016/003408 | 1/2016 | |
| WO | WO-2016003489 A1 * | 1/2016 | ......... H04L 12/4633 |

OTHER PUBLICATIONS

Sajassi et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.

Sajassi et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.

Sajassi et al., "BGP MPLS Based Ethernet VPN," Network Working Group, Oct. 18, 2014, 52 pages.

Mahalingam, et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.

Non-Final Office Action from U.S. Appl. No. 14/674,900 dated Sep. 23, 2016.

PCT Aug. 17, 2016 International Search Report and Written Opinion from International Application Serial No. PCT/US2016/023955; 17 pages.

Aweya, James, et al., "Multi-level active queue management with dynamic thresholds," Elsevier, Computer Communications 25 (2002) pp. 756-771.

(56) References Cited

OTHER PUBLICATIONS

Petersen, Chris, "Introducing Lightning: A flexible NVMe JBOF," Mar. 9, 2016, 6 pages.
Stamey, John, et al., "Client-Side Dynamic Metadata in Web 2.0," SIGDOC '07, Oct. 22-24, 2007, pp. 155-161.
Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.
Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.
Author Unknown, "Coraid EtherCloud, Software-Defined Storage with Scale-Out Infrastructure," Solution Brief, 2013, 2 pages, Coraid, Redwood City, California, U.S.A.
Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.
Author Unknown, "Creating Performance-based SAN SLAs Using Finisar's NetWisdom" May 2006, 7 pages, Finisar Corporation, Sunnyvale, California, U.S.A.
Author Unknown, "Data Center, Metro Cloud Connectivity: Integrated Metro SAN Connectivity in 16 Gbps Switches," Brocade Communication Systems, Inc., Apr. 2011, 14 pages.
Author Unknown, "Data Center, SAN Fabric Administration Best Practices Guide, Support Perspective," Brocade Communication Systems, Inc., May 2013, 21 pages.
Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-without-altering-the-actual-crc-checksum.
Author Unknown, "EMC Unisphere: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer, Enabling Confidence in Application Performance Before Deployment," 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks an Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http://en.wikipedia.org/wiki/Standard_RAID_levels.
Author Unknown, "Storage Infrastructure for the Cloud," Solution Brief, © 2012, 3 pages; coraid, Redwood City, California, U.S.A.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "Vblock Solution for SAP: Simplified Provisioning for Operation Efficiency," VCE White Paper, VCE—The Virtual Computing Environment Company, Aug. 2011, 11 pages.
Berman, Stuart, et al., "Start-Up Jeda Networks in Software Defined Storage Network Technology," Press Release, Feb. 25, 2013, 2 pages, http://www.storagenewsletter.com/news/startups/jeda-networks.
Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," 13th USENIX Conference on File and Storage Technologies (FAST '15), Feb. 16-19, 2015, 9 pages; https://www.usenix.org/system/files/conference/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].

(56) References Cited

OTHER PUBLICATIONS

Hosterman, Cody, et al., "Using EMC Symmetrix Storage in VMware vSph ere Environments," Version 8.0, EMC²Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23,-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, AO, et al., "RAIDShield: Characterizing, Monitoring, and Proactively Protecting Against Disk Failures," FAST '15, 13th USENIX Conference on File and Storage Technologies, Feb. 16-19, 2015, 17 pages, Santa Clara, California, U.S.A.
Mcquerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, 5th USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Schroeder, Bianca, et al., "Disk failures in the real world: What does an MTTF of 1,000,000 hours mean to you?" FAST '07: 5th USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10th USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "CEPH: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.
English translation of Notification to Grant Patent Right for Invention with Supplementary Search, issued by the National Intellectual Property Administration, PRC (CNIPA) on May 20, 2020, 6 pages, for corresponding CN Application 20160007852.0.

* cited by examiner

300

SCALABLE HANDLING OF BGP ROUTE INFORMATION IN VXLAN WITH EVPN CONTROL PLANE

RELATED APPLICATION

This application is a continuation of U.S. patent application Ser. No. 14/670,185 filed on Mar. 26, 2015, the contents of which is incorporated by reference in its entirety

TECHNICAL FIELD

This disclosure relates in general to the field of computer networking and, more particularly, to techniques for scalable handling of Border Gateway Protocol ("BGP") route information in a Virtual eXtensible Local Area Network ("VXLAN") with Ethernet Virtual Private Network ("EVPN") control plane.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
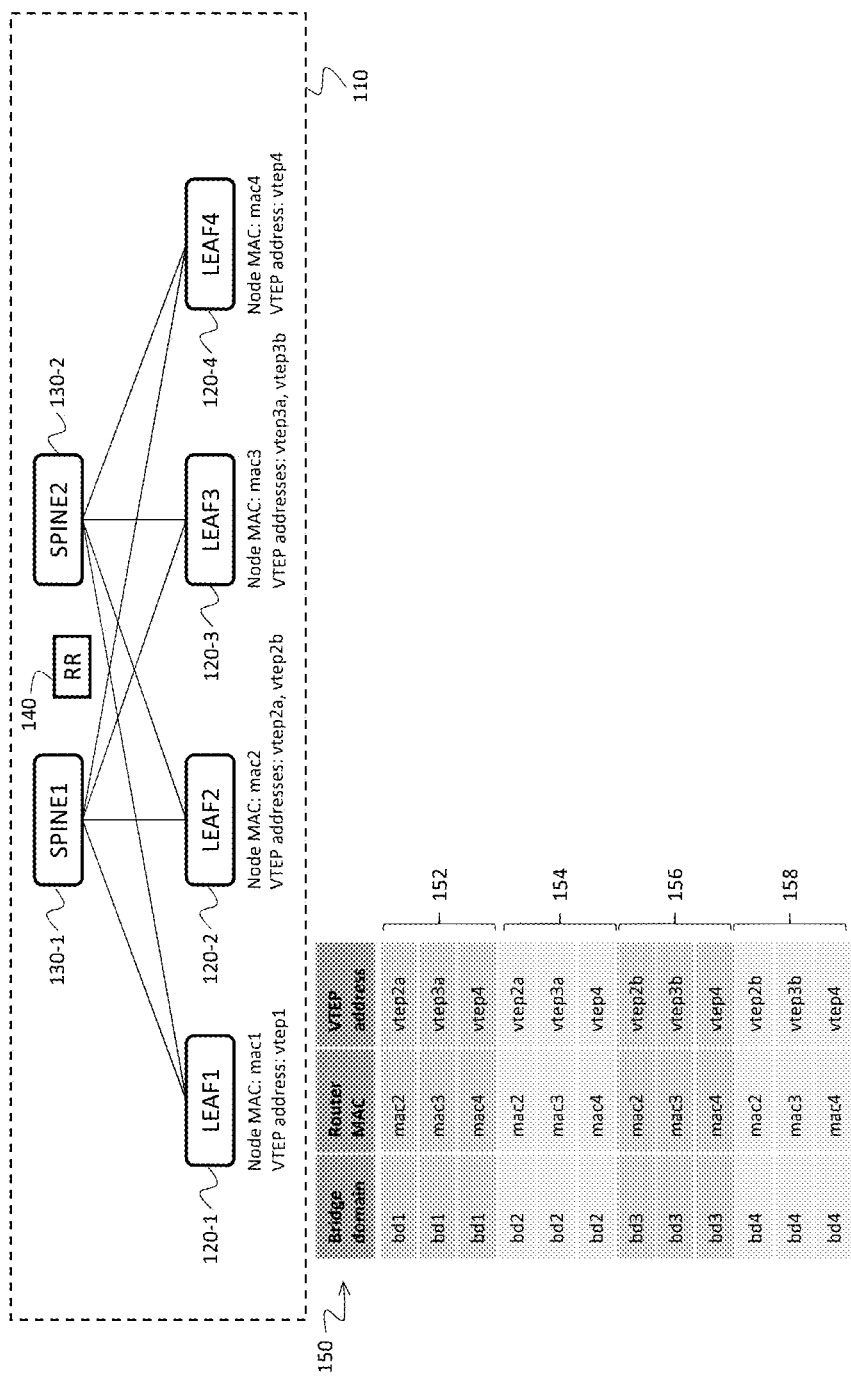
FIG. 1 is a simplified block diagram illustrating an example deployment of an IP fabric.

One aspect of the present disclosure provides an example embodiment of a method (referred to herein as a "first method") for programming a Media Access Control ("MAC") address table. The first method may be performed by a first leaf node in a network comprising N leaf nodes, where N is an integer greater than 1. Each leaf node in the network may comprise one or more Virtual Tunnel End Points ("VTEPs") and instantiate a plurality of Virtual Routing and Forwarding elements ("VRFs"). A corresponding core Bridge Domain ("BD") may be assigned to each VRF. The first method may include steps of obtaining information indicating one or more VTEP Affinity Groups (VAGs), each VAG of the one or more VAGs comprising an identification of only one VTEP of the one or more VTEPs per leaf node and obtaining information indicating assignment of each VRF of the plurality of VRFs to one of the one or more VAGs. The first method may also include steps of assigning each VAG of the one or more VAGs to a unique Filtering Identifier ("FID"), thereby generating one or more FIDs, and programming the MAC address table, using FIDs instead of BDs, by populating the MAC address table with a plurality of entries, each entry comprising a unique combination of a FID and a MAC address of a leaf node.

As used herein, the term "leaf node" refers to any network element configures with the functionality of a leaf node as described herein.

In an embodiment, the step of programming may comprise, based on the information indicating assignment of each VRF of the plurality of VRFs to one of the one or more VAGs, grouping VRFs assigned to each VAG into a different VRF subset, thereby generating one or more VRF subsets, and generating one entry for the MAC address table per each VRF subset of the one or more VRF subsets per each leaf node of the N leaf nodes except the first leaf node.

In an embodiment, each entry of the plurality of entries may identify a VTEP that is identified in a VAG that is assigned to a FID of the entry.

In an embodiment, the network may be a Virtual eXtensible Local Area Network ("VXLAN") and the term "VTEP" may refer to a VXLAN Tunnel End Point.

In an embodiment, the first method may further include receiving a routing message (i.e., an advertisement route) from a VRF of the plurality of VRFs on a second leaf node, the routing message comprising an identification of a VTEP for the second leaf node as identified in a VAG to which the VRF is assigned to, and, based on information contained in the routing message, including, in a hardware Forwarding Information Base ("FIB") table of the first leaf node (i.e. programming the FIB of the first leaf node), an Internet Protocol ("IP") route to the VRF on the second leaf node, the IP route identifying a MAC address of the second leaf node in accordance with the MAC address table. In an embodiment, such a routing message may be a MAC/IP Advertisement Route received via Ethernet Virtual Private Network ("EVPN") Border Gateway Protocol ("BGP"), and the identification of the VTEP for the second leaf node may be encoded in a Next Hop field of the routing message.

Another aspect of the present disclosure provides an example embodiment of another method (referred to herein as a "second method") for a first leaf node in a network comprising a plurality of leaf nodes to program a MAC address table. The second method includes receiving a first routing message from a second leaf node, identifying that the first routing message comprises an identification of a VTEP of the second leaf node (i.e., one VTEP comprised within the second leaf node), an identification of a MAC address of the second leaf node, and an indication that the first routing message is independent of any of a plurality of VRFs that may be instantiated on the second leaf node. The second method further includes storing, e.g. in a database and/or in a cloud, the identification of the VTEP derived from the first routing message associated with the identification of the MAC address derived from the first routing message. The second method also includes receiving a second routing message from the second leaf node, identifying that the second routing message comprises an identification of the VTEP of the second leaf node and an identification of a VRF instantiated on the second leaf node, accessing the database to determine that the identification of the VTEP derived from the second routing message is associated with the identification of the MAC derived from the first routing message, and programming the MAC address table of the first leaf node with an entry indicating the identification of the VRF derived from the second routing message, the identification of the VTEP derived from the second routing message, and the identification of the MAC address derived from the first routing message.

Yet another aspect of the present disclosure provides an example embodiment of another method (referred to herein as a "third method") for a second leaf node to provide information enabling the first leaf node to program a MAC address table according to the first or the second method described herein or another other method that the first leaf node may be configured to follow to program its MAC address table. The third method may include transmitting the first routing message and the second routing message as described above.

In an embodiment, each of the first and the second routing messages may comprises an EVPN BGP update message comprising Network Layer Reachability Information ("NLRI"). In such an embodiment, the first routing message may comprise a Route Type field encoding a predefined value indicating that the first routing message comprises the identification of the VTEP and the identification of the MAC address of the second leaf node, and another field, e.g. a Route Distinguisher field, encoding a predefined value indicating that the first routing message is independent of any of the plurality of VRFs instantiated on the second leaf node. The second routing message in such an embodiment may comprise a Route Type field encoding a predefined value indicating that the second routing message comprises a MAC/IP Advertisement Route. The second routing message may also comprise a Next Hop field encoding the identification of the VTEP of the second leaf node.

Since embodiments of the first and the second methods described herein involve programming of a MAC address table or, further programming of an IP route into the FIB table, a functional entity within a network element such as a first leaf node performing embodiments of these methods described herein will be referred to in the following as a "programming logic" of a first leaf node. Since embodiments of the third method described herein involve enabling a first leaf to program a MAC address table, a functional entity within a network element such as a second leaf node performing embodiments of these methods described herein may be referred to as a "programming logic" of a second leaf node.

As will be appreciated by one skilled in the art, aspects of the present disclosure, in particular the functionality of the programming logic of any leaf node described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing network elements such as the existing routers, switches, various control nodes, etc.) or be stored upon manufacturing of these devices and systems.

EXAMPLE EMBODIMENTS

Basics of VXLAN with EVPN Control Plane

Overlay networks in general, and Internet protocol ("IP") overlay networks in particular, are gaining popularity for providing virtual machine ("VM") mobility over Layer 3 ("L3") networks. Virtual eXtensible Local Area Network ("VXLAN") is a technique for providing a Layer 2 ("L2") overlay on an L3 network. In particular, VXLAN is used to address the need for overlay networks within virtualized data centers accommodating multiple tenants. In such overlay networks, native frames are encapsulated with an outer IP overlay encapsulation, as along with a VXLAN header, and UDP header. In VXLAN, each overlay is referred to as a VXLAN segment. VMs within the same VXLAN segment are within the same L2 domain. Each VXLAN segment is identified by a 24-bit segment identifier ("ID"), referred to as a VXLAN Network Identifier ("VNI"), which identifies virtual network segments for different tenants and allows up to 16 M VXLAN segments to coexist within a single administrative domain. The term "VXLAN segment" herein may be used interchangeably with the term "VXLAN overlay network." Additional details are provided in "VXLAN: A Framework for Overlaying Virtualized Layer 2 Networks over Layer 3 Networks" (RFC 7348) (hereinafter "VXLAN RFC"), which is hereby incorporated by reference in its entirety.

A VXLAN tunnel endpoint ("VTEP") is a hardware or software component that performs VXLAN encapsulation and decapsulation. The IP address used by a VTEP as the source address for VXLAN encapsulation is referred to as the VTEP address. A leaf node, such as a Top of Rack (ToR) switch or router, may host one or more VTEPs, depending on its capability. Additional details are provided in RFC 7348, which is hereby incorporated by reference in its entirety.

Ethernet Virtual Private Network ("EVPN") is an L2 Virtual Private Network (L2VPN) solution over IP/MPLS networks. Originally designed for applications such as data center interconnect and business L2VPN services, EVPN is recently considered as a Network Virtualization Overlay (NVO) solution. EVPN BGP has been proposed to be used as a control protocol to distribute tenant system (TS) reachability and underlay tunnel endpoint information. In the proposal, a MAC/IP Advertisement Route is used to advertise reachability to the tenant systems, where the Next Hop field of the route is set to an underlay tunnel endpoint address such as VTEP address. In addition, it has been proposed to advertise the route with a new EVPN BGP extended community attribute called "Router's MAC Extended Community" carrying the router MAC of a router that hosts the underlay tunnel endpoint specified in the Next Hop field. The router MAC is then used as the inner destination MAC of a VXLAN encapsulated packet. Additional details are provided in L2VPN workgroup internet drafts "A Network Virtualization Overlay Solution using EVPN" (draft-ietf-bess-evpn-overlay-00, dated Nov. 10, 2014) and "Integrated Routing and Bridging in EVPN" (draft-ietf-bess-evpn-inter-subnet-forwarding-00, dated Nov. 11, 2014), each of which is hereby incorporated by reference in its entirety.

Dynamic Fabric Automation ("DFA"), also referred to as "Vinci," is one exemplary architecture for facilitating data center networking. The physical topology of DFA is based on a two-tier fat tree, also known as a Clos network, in which a plurality of leaf nodes (which may be implemented as Top of Rack ("ToR") switches or routers) connects to each of a plurality of spine nodes (implemented as switches or routers) and vice versa. To support data forwarding, IP fabric is used in one embodiment of DFA. While embodiments of the present disclosure are described with reference to DFA, as illustrated with the IP fabrics shown in FIGS. 1 and 2, these embodiments are applicable to a broader scope of any VXLAN-based IP fabric, beyond DFA. In particular, functionality of the leaf nodes 220 and the MAC programming logic 260 described herein is applicable to any IP traffic comprising a plurality of leaf nodes, connected in any network topology, e.g., a topology in the absence of the second tier of the spine nodes 230.

Multitenancy is an important feature for IP fabric. Tenant traffic is either switched or routed over the IP fabric, encapsulated with VXLAN segment IDs. A tenant may be allocated one or more Virtual Local Area Network ("VLAN") on a leaf node to which the virtual machines (VMs) thereof are connected. Each VLAN is associated with a layer 2 ("L2") segment ID, which is used to encapsulate traffic switched over the fabric. In addition, a tenant may be associated with a VRF on the leaf node. The IP packets of a tenant may be forwarded over the IP fabric based on lookups in its VRF. Each VRF is associated with a layer 3 ("L3") segment ID, which is used to encapsulate traffic routed over the fabric.

FIG. 1 provides a simplified block diagram illustrating an example deployment of an IP fabric. FIG. 1 illustrates an underlay fabric 110 comprising a plurality of leaf nodes, shown as four leaf nodes 120-1 through 120-4, each of which may be implemented as a ToR switch located in a rack unit (not shown) that houses one or more network elements, such as e.g. physical servers (not shown).

In one exemplary implementation, each leaf node 120 may be connected to each of a plurality of spine nodes, shown as two spine nodes 130-1 and 130-2, which may be implemented using routers or switches, and is configured to forward communications between the physical servers of the leaf nodes 120, in the rack unit and other network elements. However, discussions herein are applicable to any IP fabric 110 and presence of the spine nodes is entirely optional. For example, without spine nodes, the leaf nodes could be connected through a full mesh topology.

One or more virtual switches and virtual machines ("VMs") (not shown) may be created and run on a physical server connected to each leaf node on top of a hypervisor (not shown). The virtual switches may be configured to manage communications of VMs in particular virtual networks and/or subnetworks ("subnets") and may be embodied by software stored and executed on the corresponding physical server connected to a leaf node, thus performing functions of a physical switch device. Similarly, the VMs may be software stored and executed on the corresponding physical servers connected to the leaf nodes and configured to exchange communications with other VMs via the fabric 110.

Though not illustrated in FIG. 1, a physical server associated with a leaf switch of each leaf node may be housed in a rack unit or "rack." Additional physical servers may also be housed in the rack. Leaf nodes 120 are responsible for managing communications (e.g., routing and forwarding) originating from and destined for physical servers (and virtual machines and virtual switches hosted by the physical servers) in the rack. Hence the term "top-of-rack" (ToR) ascribed to leaf nodes 120. Leaf nodes 120 may be used to provide redundancy and fault-tolerance for communications associated with physical servers, virtual machines and virtual switches in the rack. Thus, leaf node 120-1 is a peer to leaf node 120-2, and vice versa. These leaf nodes are configured to communicate with a network controller unit ("network controller"), not shown in FIG. 1, which is configured to manage communications between leaf nodes in different racks.

It may be appreciated that any number of two or more leaf nodes, any number of zero or more spine nodes, any number of physical servers hosting any number of virtual switches and VMs may be present in the system 110. For simplicity, FIG. 1 is further described with reference to the first leaf node 120-1. However, analogous descriptions are applicable to any other leaf nodes of the system 110.

FIG. 1 provides an exemplary illustration of two spine nodes 130, spine1-2, and four leaf nodes 120, leaf1-4, connected in a Clos network topology. Each of the leaf nodes leaf1-4 has a corresponding node MACs mac1-4, respectively. One VTEP is present in leaf1 and leaf4 each while two VTEPs are in leaf2 and leaf3 each, shown in FIG. 1 as VTEP addresses vtep1 for leaf1, vtep2a/b for leaf2, vtep3a/b for leaf3 and vtep4 for leaf4. A route reflector ("RR") 140 may establish EVPN BGP adjacencies with each leaf node. A leaf node is configured to pass its TS and VTEP information through BGP to the RR 140, which then reflects the information to other leaf nodes. For the purpose of discussion, consider that there are four VRFs in the overlay network, vrf1-4, which are instantiated in each of the four leaf nodes. In a leaf node, each VRF uses one L3 VNI to forward L3 routed traffic over the network fabric 110. A L3 VNI is mapped to a Bridge Domain (BD) internally (i.e., within each leaf node). Therefore, each VRF has a BD for routed traffic over the network fabric, which is called "core BD." For example, in the leaf node leaf1, VRFs vrf1-4 have core BDs bd1-4, respectively.

When a leaf node receives a MAC/IP Advertisement Route, it needs to program the IP route in a hardware FIB table pointing to an adjacency which contains the remote VTEP's router MAC for L2 rewrite. For post-L3 L2 lookup, it also needs to program that router MAC in its MAC address table to point to the next-hop VTEP. One approach for the programming of the MAC address table is based on allocating a MAC address table entry with the core BD tied to the route's VRF and the router MAC carried in Router's MAC Extended Community as keys and the VTEP address carried in the Next Hop field as content. Table 150 shown in FIG. 1 illustrates such a programming in leaf1. Consider an example that in vrf1, leaf2-4 advertise MAC/IP Advertisement Routes with Next Hop fields of vtep2a, vtep3a and vtep4, respectively. Consider further that leafs2-4 also advertise their respective router MACs, mac2-4, in Router's MAC Extended Community along with the routes. In such an example, when leaf1 receives the routes, it will program three MAC address table entries, keyed by vrf1's core BD, bd1, and leaf2-4's router MACs, mac2-4 (shown as entries 152). Similarly, leaf1 will program three MAC address table entries allocated for vrf2-4 each—i.e. three entries keyed by vrf2's core BD, bd2, and leaf2-4's router MACs, mac2-4 (shown as entries 154), three entries keyed by vrf3's core BD, bd3, and leaf2-4's router MACs, mac2-4 (shown as entries 156), and three entries keyed by vrf4's core BD, bd4, and leaf2-4's router MACs, mac2-4 (shown as entries 158). Therefore, a total of 12 entries are programmed in the MAC address table 150.

Generally speaking, if there are N leaf nodes and M VRFs in a network, such an approach would require M×(N−1) MAC address table entries in each a leaf node. Since a typical network contains a large number of leaf nodes, e.g. 100 leaf nodes, and a large number of VRFs, e.g. 1000 VRFs, this approach does not scale well in data plane.

Apart from the above scalability issue in data path programming, there is also a scalability issue in control path advertisement. A MAC/IP Advertisement Route is advertised with a router MAC via Router's MAC Extended Community attribute. Given that routes of different VRFs are advertised separately, a router MAC may be advertised repeatedly, once per VRF. Therefore, if there are N leaf nodes and M VRFs in a network, there may be M×(N−1) advertisements of router MACs, even if there are only N router MACs.

In view of the foregoing, at least two issues exist to be considered regarding scalable handling of BGP route information in VXLAN with EVPN control plane as described above. One is an issue in a data plane, namely the issue of how to efficiently utilize route information for the support of a large scale deployment of VXLAN overlay with EVPN control plane. Another is an issue in a control plane, namely the issue of how to cut down the redundant advertisements for better control path scalability. Accordingly, two solutions are described herein, both providing enhancements to the existing handling of BGP route information in VXLAN with EVPN control plane—one for the data plane issue and one for the control plane issue.

Addressing the Issue of Scalability in a Data Plane

Figure 2:
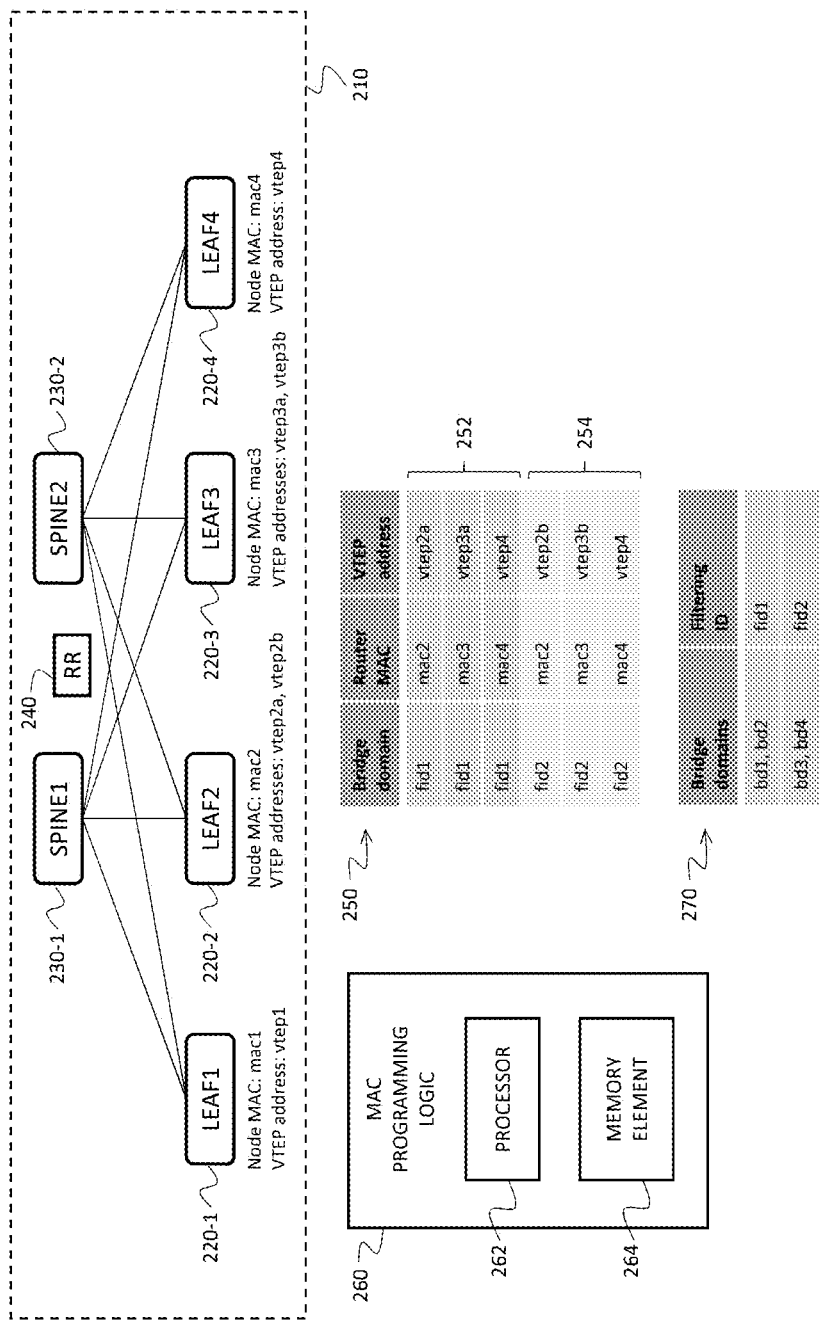
FIG. 2 is a simplified block diagram illustrating an example deployment of an IP fabric, according to an embodiment of the present disclosure.

FIG. 2 is a simplified block diagram illustrating an example deployment of an IP fabric, according to an embodiment of the present disclosure. Similar to FIG. 1, FIG. 2 provides a simplified block diagram illustrating an example deployment of a Vinci IP fabric by illustrating a leaf/spine underlay fabric 210 comprising a router reflector 240, a plurality of leaf nodes, shown as four leaf nodes 220-1 through 220-4, each leaf node connected to each of a plurality of spine nodes, shown as two spine nodes 230-1 and 230-2.

General description of the elements of the fabric 110 provided for FIG. 1, up to the description of programming a MAC address table and programming IP routes in a FIB table, is applicable to the corresponding elements of the fabric 210 illustrated in FIG. 2 and, therefore, in the interests of brevity, is not repeated here. As with the fabric illustrated in FIG. 1, discussions provided with reference to elements shown in FIG. 2 are applicable to any IP fabric 210 and presence of the spine nodes 230 is entirely optional. Programming a MAC address table and programming IP routes in a FIB table for the underlay fabric 210 of FIG. 2 is described below.

In order to facilitate the various operations performed by a leaf node as described herein, each of the leaf nodes 220 includes a programming logic 260 which may comprise at least a processor 262 and a memory element 264.

Figure 3:
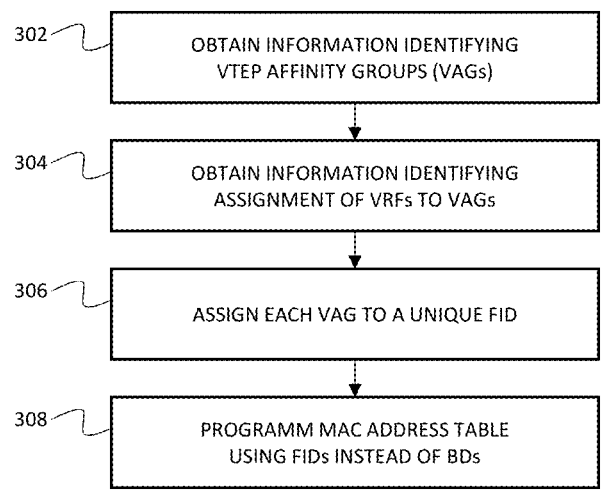
FIG. 3 is a flowchart of method steps illustrating a process of a particular leaf node programming a MAC address table, according to an embodiment of the present disclosure.

FIG. 3 is a flowchart of method steps 300 illustrating a process of a particular leaf node, e.g. the first leaf node leaf1, programming a MAC address table, according to an embodiment of the present disclosure. Referring to FIG. 3, in step 302, the programming logic 260 of a particular leaf node, e.g. the first leaf node leaf1, obtains information indicating one or more VTEP Affinity Groups (VAGs), each VAG comprising an identification of one and only one VTEP per leaf node. Thus, even when a leaf node may comprise multiple VTEPs, such as e.g. leaf 2 and leaf3 illustrated in FIG. 2, each VAG only includes an identification of only one VTEP for leaf2 and only one VTEP for leaf3.

Consider, for example, that two VAGs have been constructed, vag1 and vag2, vag1 identifying VTEPs {vtep1, vtep2a, vtep3a, vtep4} and vag2 identifying VTEPs {vtep1, vtep2b, vtep3b, vtep4}. In various embodiments, however, any number of VAGs may be used. In an embodiment, only a single VAG may be formed. However, multiple VAGs may be beneficial e.g. for load balancing purpose. Multiple VAGs may also be formed for the purpose of isolation of different sets of tenants using different groups of VTEPs. In an embodiment, a network controller, such as e.g. a data center network management (DCNM) station, may construct VAGs and then provide that information to the leaf nodes, e.g. as illustrated with step 302.

Each VRF is assigned to one of the VAGs. A MAC/IP advertisement route in a VRF can only use a VTEP in the VAG in the Next Hop field of a MAC/IP advertisement route.

While each VRF is assigned to only one VAG, a single VAG may have many VRFs assigned to it. Thus, there is a one-to-many relationship between VAGs and VRFs. In an embodiment, a network controller, such as e.g. the DCNM station, may assign VRFs to VAGs and then provide that information to the leaf nodes, e.g. as illustrated with step 304. In step 304, the programming logic 260 of the leaf1 obtains information indicating assignment of each VRF to one of the VAGs.

Consider, for example, that vrf1 and vrf2 are assigned to vag1, while vrf3 and vrf4 are assigned to vag2. A MAC/IP Advertisement Route is advertised with a VTEP in the VAG assigned to its VRF. Therefore, for example, a vrf1 route advertised by leaf2 would have vtep2a encoded in its Next Hop field, while a vrf3 route advertised by leaf3 would have vtep3b as its Next Hop.

Since leaf1 is now informed of which VAGs have been formed (step 302), in step 306, the programming logic 260 of the leaf1 assigns each VAG to a FID that is unique within the leaf1, thereby generating one or more FIDs (the same number of FIDs as VAGs, since there is one-to-one correspondence between FIDs and VAGs).

Originally specified in IEEE 802.1Q, a FID identifies a set of VLANs among which Shared VLAN Learning (SVL) may take place. IEEE 802.1Q provides that, in a MAC address table, FID, instead of VLAN ID, may be used as a key for MAC address lookup. As an extension to VLAN, some Cisco switches, such as e.g. Nexus 5600 BigSur ASIC, further provide that a bridge domain may also be mapped to a FID to support shared learning in hardware. While these examples provide that a VLAN and/or a BD may be mapped to a FID, how exactly the mapping is done is not prescribed.

As a result of the assignment of step 306, core BDs of the VRFs which are assigned the same VAG are mapped into the FID assigned to the VAG. Continuing with the example described in the earlier steps, leaf1 assigns vag1 and vag2 filtering identifiers fid1 and fid2, respectively. Since vrf1 and vrf2 are assigned to vag1, core BDs of vrf1 and vrf2, i.e. bd1 and bd2, are mapped to fid1. Since vrf3 and vrf4 are assigned to vag2, core BDs of vrf3 and vrf4, i.e. bd3 and bd4, are mapped to fid2. Such a BD to FID mapping is illustrated in a table 270 shown in FIG. 2.

Once BD to FID mapping is determined, the programming logic 260 in leaf1 can populate the MAC address table of leaf1 with entries using FID, instead of BD, as a key (step 308). Consider, for example, that leaf2 advertises two routes, one route in vrf1 and the other route in vrf2. When leaf1 receives the advertisement routes, the programming logic 260 will install only one entry in its MAC address table, because bd1 (i.e., the core BD of vrf1) and bd2 (i.e., the core BD of vrf2) are mapped to the same FID, fid1. On the other hand, consider, for example, that leaf2 advertises another route in vrf3. When leaf1 receives that advertisement route, the programming logic 260 in leaf1 will install a new entry in its MAC address table, because bd3 (i.e., the core BD of vrf3) is mapped to a different FID, fid2, and thus cannot share with the previous entry "fid1" as a key.

Thus, programming the MAC address table in leaf1 using FIDs instead of BDs comprises populating the MAC address table in leaf1 with entries each of which comprises a unique combination of a FID and a MAC address of a leaf node. This is illustrated with a MAC address table 250 shown in FIG. 2 for leaf1, for the example described in association with method steps 300. Compared to the MAC address table shown in FIG. 1, the number of entries in the table shown in FIG. 2 is reduced from 12 to 6, where, in comparison with FIG. 1, entries for vrf1 and vrf2 are combined together and shown as entries 252 for fid1 (because fid1 is assigned to vag1 to which vrf1 and vrf2 are assigned to), and entries for vrf3 and vrf4 are combined together and shown as entries 254 for fid2 (because fid2 is assigned to vag2 to which vrf3 and vrf4 are assigned to).

In other words, populating the MAC address table in leaf1 in step 308 may be described as, first, based on the information received in step 302 indicating assignment of each VRF to one of the VAGs, grouping VRFs assigned to each VAG into a different VRF subset (thereby generating one or more VRF subsets), and, second, generating one entry for the MAC address table per each VRF subset per each leaf node of the N leaf nodes except the first leaf node. Continuing with the example described above, such an approach would result in, first, grouping VRFs into 2 subsets (subset 1: vrf 1 and vrf2; subset 2: vrf3 and vrf4), and then generating one entry per subset per leaf node except the first node—i.e. one entry for subset 1 for leaf node leaf2 (the first entry in the table 250), one entry for subset 1 for leaf node leaf3 (the second entry in the table 250), one entry for subset 1 for leaf node leaf4 (the third entry in the table 250), and then another 3 entries for the 3 leaf nodes leaf2-4 for the subset 2.

Generally speaking, if there are N leaf nodes and G VAGs in the network (G being an integer equal to or greater than 1), the method illustrated in FIG. 3 results in G×(N−1) MAC address table entries in a lead node. Given a typically small number of VAGs, e.g. 2, and a large number of VRFs, e.g. 1000, such an approach scales much better than that described in association with FIG. 1.

As a special case, if each leaf node has only one VTEP, only one VAG can be constructed. In this case, the approach according to FIG. 3 would require only (N−1) MAC address table entries, which is the minimal number of entries possible.

Figure 4:
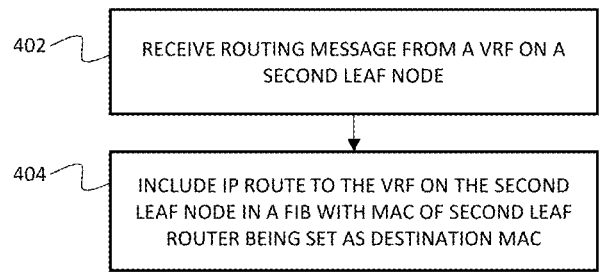
FIG. 4 is a flowchart of method steps illustrating a process of a particular leaf node programming an IP route into its FIB, according to an embodiment of the present disclosure.

FIG. 4 is a flowchart of method steps 400 illustrating a process of a particular leaf node, e.g. the first leaf node leaf1, programming an IP route into its FIB (not shown), according to an embodiment of the present disclosure. Referring to FIG. 4 and continuing with the example described in association with FIG. 3, in step 402, the programming logic 260 of the first leaf node leaf1 receives a MAC/IP advertisement route for a particular VRF on a particular other (i.e., second) leaf node, e.g. from vrf1 on leaf2. In step 404, based on the info received in step 402, the programming logic 260 includes in a FIB table of the leaf1, an IP route to that VRF on the other leaf node, the IP route identifying a MAC address of the second leaf node in accordance with the MAC address table. Continuing with the example described above, this means that the programming logic of leaf1 extracts the VTEP for leaf2 from the advertisement (so leaf1 extracts "vtep2a" because leaf2 has to include that vtep, and not vtep2b, as the Next Hop), obtains MAC address for vtep2a from the VTEP router's MAC Extended Community attribute carried along with the BGP MAC/IP advertisement route for vrf1 on leaf2 (i.e., for vtep2a, the MAC is "mac2"), and then programs the FIB in leaf1 with a route with the destination MAC equal to mac2. In the MAC address table, leaf1 will program an entry with BD/FID and mac2 as a key and vtep2a as content.

In summary, the above-described embodiments of the VTEP affinity approach to scale MAC address table programming in a data path provide enhancements to existing handling of BGP route information in VXLAN with EVPN control plane. As a result, the number of MAC address table entries needed for a large scale deployment of VXLAN with EVPN as control plane may be substantially reduced.

Addressing the Issue of Scalability in a Control Plane

Section 7 of Network Working Group Internet Draft "BGP MPLS Based Ethernet VPN" (draft-ietf-l2vpn-evpn-11, dated Oct. 18, 2014), which is hereby incorporated by reference in its entirety, defines a new BGP Network Layer Reachability Information (NLRI), called "EVPN NLRI." The following format of the EVPN NLRI is proposed: Route Type (1 octet), Length (1 octet), and Route Type specific (variable). The Route Type field defines encoding of the rest of the EVPN NLRI (Route Type specific EVPN NLRI). The Length field indicates the length in octets of the Route Type specific field of EVPN NLRI.

In addition to the four Route Types proposed in this document (Ethernet Auto-Discovery (A-D) route denoted as Route Type "1", MAC/IP advertisement route denoted as Route Type "2", Inclusive Multicast Ethernet Tag Route denoted as Route Type "3", and Ethernet Segment Route denoted as Route Type "4"), embodiments of the present disclosure are based on using a new Route Type of such EVPN NLRI, which Route Type may be called e.g. "VTEP's Router MAC route" (and be denoted e.g. "5"). A VTEP's Router MAC route type specific EVPN NLRI would consist of a VTEP address, the router MAC of the leaf node that hosts the VTEP, and a Route Distinguisher (RD) set to a predefined value, e.g. all zeros, so that it can be advertised in a BGP update independent of VRF. Such a VTEP's Router MAC EVPN NLRI would then be transmitted by a leaf node in combination with one or more MAC/IP advertisement route EVPN NLRIs (not necessarily at the same time) to enable another leaf node to program an entry in the MAC address table, as described below with reference to FIGS. 5 and 6.

Figure 5:
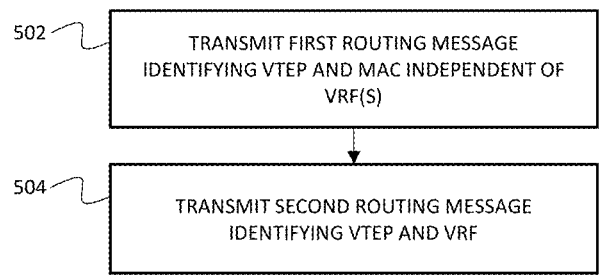
FIG. 5 is a flowchart of method steps illustrating a process of a particular leaf node transmitting routing messages that enable another leaf node to program a MAC address table, according to an embodiment of the present disclosure.
Figure 6:
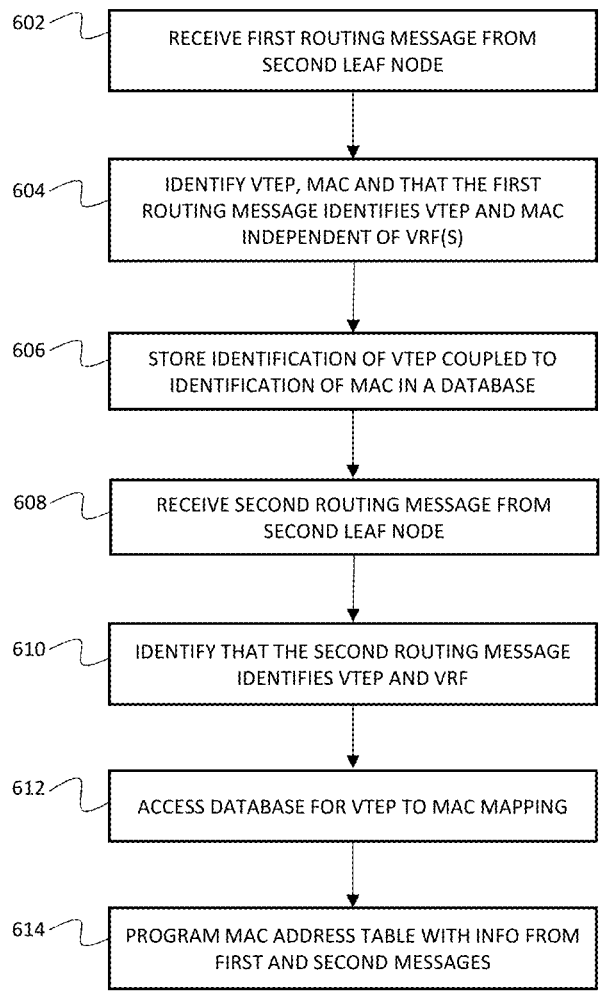
FIG. 6 is a flowchart of method steps illustrating a process of a particular leaf node programming a MAC address table after receiving the routing messages illustrated in FIG. 5, according to an embodiment of the present disclosure.

FIG. 5 is a flowchart of method steps 500 illustrating how the routing messages are transmitted according to an embodiment of the present disclosure, while FIG. 6 is a flowchart of method steps 600 illustrating how a leaf node that has received the messages of FIG. 5 can program its' MAC address table according to an embodiment of the present disclosure. For illustrative purposes, the leaf node that transmits the messages as shown in FIG. 5 is referred to herein as a "second leaf node" while the leaf node that receives the messages and programs its' MAC address table is referred to as a "first leaf node." Steps of FIGS. 5 and 6 are to be understood to be performed by logical entities within or associated with such a second and first leaf nodes, respectively, the logical entities comprising at least a processor and a memory that enable the leaf nodes to perform the steps.

As shown in FIG. 5, the method 500 may begin with a step 502, where the second leaf node transmits a first routing message comprising an identification of one VTEP comprises within the second leaf node, an identification of a MAC address of the second leaf node, and an indication that the first routing message is independent of any VRFs that may be instantiated on the second leaf node. Such a message could be a BGP update message comprising EVPN NLRI with Route Type field encoding a value that indicates that the route type is a VTEP's Router MAC route. The indication that the first routing message is independent of VRFs on the second leaf node may be provided by encoding a particular field within such EVPN NLRI, e.g. a RD field with a predefined value, such as e.g. all zeros.

In step 504, the second leaf node transmits a second routing message comprising an identification of the VTEP of the second leaf node that was identified in the first routing message and an identification of a VRF instantiated on the second leaf node. Such a message could be a BGP update message comprising EVPN NLRI with Route Type field encoding a value that indicates that the route type is a MAC/IP route as defined e.g. in Section 7 of Network Working Group Internet Draft "BGP MPLS Based Ethernet VPN" described above. The VTEP address could be included in the Next Hop field of such a routing message.

As shown in FIG. 6, the method 600 may begin with step 602 where one of the leaf nodes, e.g. the first leaf node, receives the first routing message transmitted by the second leaf node as described in step 502 above.

In step 604, the first leaf node can decode the received first message to obtain the identifications of the VTEP and MAC addresses included in their respective fields of the first routing message as well as to identify that the first routing message was independent of any VRFs on the second leaf node (e.g. by decoding the Route Type value encoded in that field).

In step 606, the first leaf node stores the VTEP and the MAC obtained from the first routing message in a database in such a manner that associated the VTEP address provided in the first routing message to the MAC address provided in the first routing message.

In step 608, the first leaf node receives the second routing message transmitted by the second leaf node as described in step 504 above. Note that, in various embodiments, timing of when the first leaf nodes receives the first and second routing messages may differ—the messages may be received substantially simultaneously, partially overlapping in time (in any order), or sequentially (in any order).

In step 610, the first leaf node identifies that the second routing message comprises a MAC/IP Advertisement route (e.g. by decoding the Route Type value encoded in that field and determining that the Route Type indicates "MAC/IP Advertisement route" update message), and obtains the VTEP and VRF identified in that message. For example, the VTEP can be encoded in the Next Hop field of the second routing message.

In step 612, the first leaf node accesses the database to determine MAC that is associated with the VTEP identified in the second routing message.

In step 614, the first leaf node may then program an entry in its' MAC address table with the VTEP address derived from the second routing message and the MAC address derived from the first routing message. In an embodiment when the MAC address table is programmed using BD's and MAC addresses as keys (e.g., the implementation described with reference to FIG. 1), such an entry may include an identification of the VRF derived from the second routing message by indicating a core BD assigned to that VRF (e.g. as illustrated with any one of the entries shown in the table 150). In an embodiment when the MAC address table is programmed using FID's and MAC addresses as keys (e.g., the implementation described with reference to FIG. 2, however other implementations using FID/MAC combination as keys may be used), such an entry may include an identification of the VRF derived from the second routing message by indicating the node-unique FID associated with that VRF (e.g. as illustrated with any one of the entries shown in the table 250).

The first leaf node may then install it's FIB based on the information contained in the first and second routing messages, e.g. by including in the FIB an IP route to the VRF on the second leaf node, the IP route identifying a MAC address of the second leaf node in accordance with the MAC address table entry programmed in step 614.

Consider that e.g. leaf2 advertises a route in vrf1 using EVPN NLRI. To do so, leaf2 will first generate and transmit a BGP update message (i.e., the advertisement of step 502 above) that comprises EVPN NLRI with Route Type field encoding a value that indicates that the route type is a VTEP's Router MAC route and with the RD field encoding a predetermined value (e.g. all zeros) indicating that the advertisement is independent of a particular VRF within leaf2. When another leaf node, e.g. leaf1, receives such an advertisement (step 602 above), the node (e.g. programming logic within the node) processes the advertisement to identify and store the mapping of VTEP address and router MAC carried in the message in a database (steps 604, 606 above). Furthermore, e.g. leaf2 will generate and transmit another BGP update message (i.e., the advertisement of step 504 above) that comprises EVPN NLRI with Route Type field indicating that this update message is a MAC/IP advertisement route. When another leaf node, e.g. leaf1, receives such an advertisement (step 608 above), the node (e.g. programming logic within the node) processes the advertisement to install entries in the MAC address table of the node (steps 610, 612, 614 above). In particular, the programming logic of leaf1 will examine the other BGP update message to determine that the Route Type field encodes a value indicating that the received EVPN NLRI is of MAC/IP advertisement route type and determine the VTEP address encoded in the Next Hop field of the message (step 610 above). Continuing with the example illustrated in FIG. 1, leaf1 will determine that the address vtep2a is encoded in the Next Hop field of the routing message (because vrf1 uses vtep2a). In the next step, the programming logic of leaf1 will derive the MAC address of leaf2 (i.e., mac2) based on the determined VTEP (i.e., vtep2a) and the previously received mapping of VTEP address, vtep2a, and router MAC, mac2, stored in the database (step 612 above). After that, the programming logic of leaf1 will install an entry in the MAC address table of leaf1 (step 614 above). In the implementation shown in FIG. 1, such an entry would be the entry (of the table 150) containing bd1 (i.e., the core BD associated with vrf1) and the router MAC mac2 as the keys. On the other hand, in the implementation shown in FIG. 2, such an entry would be the entry (of the table 250) containing fid1 (i.e., the FID assigned to vrf1) and the router MAC mac2 as the keys. The content is the same in both of these entries of FIGS. 1 and 2, i.e. the VTEP address vtep2.

Using such a new Route Type of EVPN NLRI, a MAC/IP Advertisement Route can be advertised in a manner that avoids advertising a router MAC via Router's MAC Extended Community. The reason is that the router MAC can be derived based the VTEP address already contained in route's Next Hop field and the mapping advertised in a VTEP's router MAC route. With such an approach, if there are N leaf nodes and V VTEPs per leaf node, using the new Route Type described herein requires only V×N advertisements of router MACs. Given a small number of VTEPs per leaf, e.g. 2, and a typically much larger number of VRFs, e.g. 1000, such an approach scales much better than what is originally specified in Section 5.1.1 of L2VPN Workgroup Internet Draft "Integrated Routing and Bridging in EVPN" described above.

In summary, the above-described embodiments of the new route type (VTEP's Router MAC route) for the EVPN NLRI to scale router MAC advertisement in control path provide enhancements to existing handling of BGP route information in VXLAN with EVPN control plane. As a result, the number of router MAC advertisements needed for a large scale deployment of VXLAN with EVPN as control plane may be substantially reduced.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to scalable handling of BGP route information in VXLAN with EVPN control plane. This may be inclusive of appropriate algorithms and communication protocols that allow for the effective exchange of data or information.

In one implementation, leaf nodes described herein may include software to achieve (or to foster) the functions discussed herein for scalable handling of BGP route information in VXLAN with EVPN control plane where the software is executed on one or more processors to carry out the functions. This could include the implementation of instances of programming logic and/or any other suitable element that would foster the activities discussed herein. Additionally, each of the leaf nodes can have an internal structure (e.g., a processor, a memory element, etc.) to facilitate some of the operations described herein. In other embodiments, these functions for scalable handling of BGP route information in VXLAN with EVPN control plane may be executed externally to the leaf nodes, or included in some other network element to achieve the intended functionality. Alternatively, leaf nodes may include software (or reciprocating software) that can coordinate with other network elements in order to achieve the functions related to scalable handling of BGP route information in VXLAN with EVPN control plane described herein. In still other embodiments, one or several devices may include any suitable algorithms, hardware, software, components, modules, interfaces, or objects that facilitate the operations thereof.

In certain example implementations, functions related to scalable handling of BGP route information in VXLAN with EVPN control plane outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving scalable handling of BGP route information in VXLAN with EVPN control plane, as outlined herein. Additionally, each of these devices may include a processor that can execute software or an algorithm to perform the scalable handling of BGP route information in VXLAN with EVPN control plane as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of scalable handling of BGP route information in VXLAN with EVPN control plane, as potentially applied to a myriad of other architectures.

It is also important to note that the steps in the FIGS. 3-6 illustrate only some of the possible scenarios that may be executed by, or within, the leaf nodes described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the leaf nodes in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method to program a Media Access Control (MAC) address table, the method comprising:
    obtaining identification information identifying one or more Virtual Tunnel End Point (VTEP) Affinity Groups (VAGs), each of the one or more VAGs including an identification of only one VTEP per leaf node;
    generating a Filtering Identifier (FID) for each of the one or more VAGs;
    obtaining assignment information identifying assignment of each Virtual Routing and Forwarding element (VRF) of a plurality of VRFs instantiated on each leaf node to a respective one of the one or more VAGs;
    grouping each of the plurality VRFs based on the assignment information into one or more VRF subsets; and
    populating the MAC address table with the FIDs, a MAC address of a leaf node, and the one or more VRF subsets.

2. The method according to claim 1, further comprising:
    generating one entry for the MAC address table per each VRF subset of the one or more VRF subsets.

3. The method according to claim 1, wherein the MAC address table includes at least one entry with a VTEP identified in a VAG assigned to a FID.

4. The method according to claim 1, wherein the MAC address table is programmed by a first leaf node.

5. The method according to claim 4, further comprising:
    receiving a routing message from a VRF of the plurality of VRFs on a second leaf node, the routing message comprising an identification of a VTEP for the second leaf node as identified in a VAG to which the VRF is assigned to; and
    based on routing information contained in the routing message, including, in a Forwarding Information Base ("FIB") table of the first leaf node, an Internet Protocol ("IP") route to the VRF on the second leaf node, the IP route identifying a MAC address of the second leaf node in accordance with the MAC address table.

6. The method according to claim 5, wherein the routing message comprises a MAC/IP Advertisement Route.

7. The method according to claim 5, wherein the routing message is received via Ethernet Virtual Private Network ("EVPN") Border Gateway Protocol ("BGP") and the identification of the VTEP for the second leaf node is encoded in a Next Hop field of the routing message.

8. One or more non-transitory computer readable storage media encoded with software comprising computer executable instructions and, when the software is executed, operable to carry out a method to program a Media Access Control (MAC) address table, the method comprising:
    obtaining identification information identifying one or more Virtual Tunnel End Point (VTEP) Affinity Groups (VAGs), each of the one or more VAGs including an identification of only one VTEP per leaf node;
    generating a Filtering Identifier (FID) for each of the one or more VAGs;
    obtaining assignment information identifying assignment of each Virtual Routing and Forwarding element (VRF)

of a plurality of VRFs instantiated on each leaf node to a respective one of the one or more VAGs;

grouping each of the plurality VRFs based on the assignment information into one or more VRF subsets; and populating the MAC address table with the FIDs, a MAC address of a leaf node, and the one or more VRF subsets.

9. The one or more non-transitory computer readable storage media according to claim 8, the method further comprising:

generating one entry for the MAC address table per each VRF subset of the one or more VRF subsets.

10. The one or more non-transitory computer readable storage media according to claim 8, wherein the MAC address table includes at least one entry identifies a VTEP identified in a VAG assigned to a FID.

11. The one or more non-transitory computer readable storage media according to claim 8, wherein the MAC address table is programmed by a first leaf node.

12. The one or more non-transitory computer readable storage media according to claim 11, wherein the method further comprises:

receiving a routing message from a VRF of the plurality of VRFs on a second leaf node, the routing message comprising an identification of a VTEP for the second leaf node as identified in a VAG to which the VRF is assigned to; and based on information contained in the routing message, including, in a Forwarding Information Base ("FIB") table of the first leaf node, an Internet Protocol ("IP") route to the VRF on the second leaf node, the IP route identifying a MAC address of the second leaf node in accordance with the MAC address table.

13. The one or more non-transitory computer readable storage media according to claim 12, wherein the routing message comprises a MAC/IP Advertisement Route and is received via Ethernet Virtual Private Network ("EVPN") Border Gateway Protocol ("BGP"), and the identification of the VTEP for the second leaf node is encoded in a Next Hop field of the routing message.

14. A system to program a Media Access Control (MAC) address table, the system comprising:

at least one memory configured to store computer executable instructions; and at least one processor coupled to the at least one memory and configured, when executing the instructions, to:

obtain identification information identifying one or more Virtual Tunnel End Point (VTEP) Affinity Groups (VAGs), each of the one or more VAGs including an identification of only one VTEP per leaf node;

generate a Filtering Identifier (FID) for each of the one or more VAGs;

obtain assignment information identifying assignment of each Virtual Routing and Forwarding element (VRF) of a plurality of VRFs instantiated on each leaf node to a respective one of the one or more VAGs;

group each of the plurality VRFs based on the assignment information into one or more VRF subsets; and populate the MAC address table with the FIDs, a MAC address of a leaf node, and the one or more VRF subsets.

15. The system according to claim 14, wherein the at least one processor is further configured to:

generate one entry for the MAC address table per each VRF subset of the one or more VRF subsets.

16. The system according to claim 14, wherein the MAC address table includes at least one entry identifies a VTEP identified in a VAG assigned to a FID.

17. The system according to claim 14, further comprising:

a first leaf node configured to program the MAC address table.

18. The system according to claim 17, wherein the at least one processor is further configured to:

receive a routing message from a VRF of the plurality of VRFs on a second leaf node, the routing message comprising an identification of a VTEP for the second leaf node as identified in a VAG to which the VRF is assigned to; and based on information contained in the routing message, include, in a Forwarding Information Base ("FIB") table of the first leaf node, an Internet Protocol ("IP") route to the VRF on the second leaf node, the IP route identifying a MAC address of the second leaf node in accordance with the MAC address table.

19. The system according to claim 18, wherein the routing message is received via Ethernet Virtual Private Network ("EVPN") Border Gateway Protocol ("BGP") and the identification of the VTEP for the second leaf node is encoded in a Next Hop field of the routing message.

20. The system according to claim 14, wherein each VRF comprises a corresponding core Bridge Domain (BD) assigned thereto and wherein the MAC address table is populated using FIDs instead of BDs.

* * * * *